US007013163B2

(12) United States Patent
Jaggers et al.

(10) Patent No.: US 7,013,163 B2
(45) Date of Patent: Mar. 14, 2006

(54) PORTABLE WIRELESS COMMUNICATION DEVICE DOCKING SYSTEM

(75) Inventors: Christopher M. Jaggers, Austin, TX (US); Robert L. McMahan, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 469 days.

(21) Appl. No.: 09/769,943

(22) Filed: Jan. 26, 2001

(65) Prior Publication Data

US 2002/0103007 A1    Aug. 1, 2002

(51) Int. Cl.
*H04B 1/38* (2006.01)
*H04M 1/00* (2006.01)
(52) U.S. Cl. ............... 455/557; 455/556.1; 455/575.1; 455/586; 455/90.3; 361/681
(58) Field of Classification Search ............ 455/550.1, 455/554.2, 556.1, 557, 566, 573, 574, 575.1, 455/575.4, 90.3, 90.1; 361/679, 681, 682, 361/683, 687, 727, 724; 245/124.2, 121
See application file for complete search history.

(56) References Cited

U.S. PATENT DOCUMENTS

| | | | | |
|---|---|---|---|---|
| 4,776,553 A | * | 10/1988 | Kobayashi | 248/558 |
| 5,313,596 A | | 5/1994 | Swindler et al. | 395/325 |
| 5,396,400 A | | 3/1995 | Register et al. | 361/686 |
| 5,402,310 A | | 3/1995 | Penniman | 361/686 |
| 5,452,180 A | | 9/1995 | Register et al. | 361/686 |
| 5,526,493 A | | 6/1996 | Shu | 395/281 |
| 5,552,959 A | | 9/1996 | Penniman et al. | 361/686 |
| 5,568,359 A | | 10/1996 | Cavello et al. | 361/686 |
| 5,579,528 A | | 11/1996 | Register | 395/671 |
| 5,699,226 A | | 12/1997 | Cavello | 361/686 |
| 5,812,356 A | | 9/1998 | O'Connor | 361/179 |
| 5,818,691 A | | 10/1998 | McMahan et al. | 361/686 |
| 5,822,185 A | | 10/1998 | Cavello | 361/686 |
| 5,960,208 A | * | 9/1999 | Obata et al. | 395/750.07 |
| 5,969,939 A | | 10/1999 | Moss et al. | 361/686 |
| 5,991,838 A | | 11/1999 | Swindler et al. | 710/101 |
| 6,011,687 A | | 1/2000 | Gluskoter et al. | 361/686 |
| 6,023,411 A | | 2/2000 | Howell et al. | 361/686 |
| 6,049,454 A | | 4/2000 | Howell et al. | 361/686 |
| 6,069,790 A | | 5/2000 | Howell et al. | 361/686 |
| 6,073,031 A | * | 6/2000 | Helstab et al. | 455/557 |
| 6,222,728 B1 | | 4/2001 | Jaggers et al. | 361/686 |

(Continued)

OTHER PUBLICATIONS

U.S. Appl. No. 09/128,044 filed Aug. 3, 1998 entitled "Computer Docking Guidance System" by Howell, et al.

(Continued)

*Primary Examiner*—Edan Orgad
(74) *Attorney, Agent, or Firm*—Haynes and Boone, LLP

(57) ABSTRACT

A docking station for a wireless communication device, such as a cellular telephone. The docking station includes a cradle for the cellular phone and comprises an associated LCD that enhances the video display capabilities of the cellular telephone. When docked, the cellular telephone draws power from a voltage supply provided by the docking station. While the cellular telephone is docked, a charging circuit recharges the cellular telephone battery. The docking station may be disconnected from an AC outlet so that the docked cellular telephone retains both enhanced display capabilities, which prove to be highly desirable for applications such as Internet access, as well as its inherent portability. Even in the portable mode, where the docking station is disconnected from the AC outlet, the docking station recharges the cellular telephone battery.

16 Claims, 3 Drawing Sheets

U.S. PATENT DOCUMENTS

| | | | |
|---|---|---|---|
| 6,336,038 B1 * | 1/2002 | Nojima et al. | 455/557 |
| 6,546,262 B1 * | 4/2003 | Freadman | 455/557 |
| 2002/0072390 A1 * | 6/2002 | Uchiyama | 455/557 |
| 2003/0197679 A1 * | 10/2003 | Ali et al. | 345/158 |
| 2004/0165348 A1 * | 8/2004 | Clark et al. | 361/686 |

OTHER PUBLICATIONS

U.S. Appl. No. 09/014,191, filed Jan. 27, 1998 entitled "Portable Computer Ejection Mechanism for Docking Devices" by Howell, et al.

* cited by examiner

PORTABLE WIRELESS COMMUNICATION DEVICE DOCKING SYSTEM

BACKGROUND

This disclosure relates to wireless communication technology and, more particularly, to technology for enhancing the capabilities of wireless communications devices, such cellular or PCS telephones, so as to more closely approach the capabilities of personal computers, especially as those capabilities relate to the enhancement of Internet access or access to other sources of data or information.

In recent years the personal computer (PC) industry has witnessed a substantial change in the manner in which PCs are primarily used. During earlier stages in the rise of PC popularity, PCs were primarily looked to for their computational capacity. Subsequently, word processing, spreadsheet, database and presentation applications began to assume the forefront. Still more recently, the PC has come to be seen as a communications device, and has experienced rapidly expanding use as a communications terminal from which to send and receive electronic messages. Along these lines, consumer acquisitions of PC's have lately been stimulated by the objective of using the PC simply as an appliance to access the Internet. In this mode, much of the embedded capability of the PC lies dormant, and PC users tend to become preoccupied with information transmission bandwidth, rather than processing power or expandability.

Concurrently, the proliferation of wireless communications devices, such as cellular telephones, has accelerated to the point that cellular telephones appear ubiquitous and are predicted by some to ultimately displace wired communications facilities. In fact, cellular telephone sales now exceed sales of PCs by a margin of approximately 2 to 1, and it is anticipated that this margin will expand. As cellular telephone technology has evolved, cellular telephone functionality has become correspondingly more robust, and cellular phones now offer capabilities that were once the exclusive province of PCs. In fact, some cellular telephones now resemble small, low-end PCs with wireless access to data networks, including the Internet. Ironically, many consumers are now believed to acquire cellular telephones merely as an Internet-access appliance.

That having been said, cellular telephones are burdened by a number of characteristics that render them substantially less than ideal for applications such as Internet access. Perhaps paramount among the shortcomings of cellular telephones is the incommodious user interface they present. Unlike desktop or portable computers, present-day cellular telephones fail to include browsers, or useable displays and keyboards. The small screen size renders cellular telephones unsuitable as an interface to all but the most primitive sources of information, for example, e-mail, stock quotations, paging information, and the like.

Accordingly, what is desired is a solution that enables cellular telephones to operate as a convenient device for obtaining information from on-line, and other, information sources, such as the Internet. Preferably, the solution will not compromise the desirability of the cellular telephone as a portable communications device, but will complement existing cellular telephone capabilities in a manner that promotes the cellular telephone as a viable alternate to low-end PCs that are primarily acquired for use as an Internet-access terminal or as a device to access other information sources.

SUMMARY OF THE INVENTION

The above objects, advantages and capabilities are achieved in one aspect of the disclosure by a docking station for a wireless communications device, such as a cellular telephone. The docking station includes a support structure that includes a cradle for the wireless telephone and that exhibits a planar surface on which a display device is mounted. An internal charging circuit is coupled to a docking station power source for charging the power source. A first connector assembly couples the charging circuit to an external source of electrical energy, in an expected configuration, an AC outlet. A second connector assembly coupled to the output of the charging circuit selectively couples the charging circuit to the cellular telephone in order to recharge the cellular telephone battery. A switch selectively couples the station power source to the cellular telephone when the cellular telephone is docked, so that in the docked mode the cellular telephone operates from the station power source, while its internal battery is recharged by the docking station.

The disclosure likewise inheres in a docking station, for a wireless communication device, that comprises a docking housing having a planar first surface. A display device is mounted on the planar first surface, and a cradle disposed on the docking housing supports the wireless communication device. A connector electrically couples the docking station to the wireless communication device, so as to transmit both power and data to the device. The station is equipped with a charging circuit and a switch that selectively couples the charging circuit to an internal voltage source. In a preferred embodiment, the switch connects the charging circuit to the internal voltage source when there is not a wireless communication device docked at the station. When a wireless communication device is docked, the switch enables the charging circuit to be coupled to the wireless communication device for charging.

From an alternative perspective, the present device is an apparatus, for use in a docking station, that selectively supplies power to a communications device that is docked at the docking station. The apparatus comprises a connector for electrically coupling the docking station to the communications device. The connector has at least first and second terminals. A switch having a pole, a first terminal, and a second terminal is operable in response to status information that indicates whether a communications device is docked at the docking station. A charging circuit is coupled to the pole of the switch, and a station power source coupled to the first terminal of the switch. In addition, the apparatus includes means for determining whether a communication device is docked at the station for providing status information as a result of the determination.

In another embodiment, the disclosure may be exploited as a method of enhancing the capabilities of a wireless communications device in information acquisition applications. According to the method, the wireless communications device, which may be a cellular telephone, is mounted on (docked at) a docking station that comprises a receptacle, in the form of a cradle, for the cellular telephone; a display device; a connector for effecting an electrical interface to the cellular telephone; a docking station power source; a charging circuit; and a switch that operates (effects predetermined connection) in response to information indicating whether a cellular telephone is docked at the station. In order to embellish the limited video display capabilities typical of cellular telephones, the video output of the cellular telephone is coupled to an enhanced display provided by the docking station. Where a cellular telephone is docked, the switch causes (i) the station power source to be coupled to the cellular telephone and (ii) the charging circuit to charge the cellular telephone battery.

BRIEF DESCRIPTION OF THE DRAWINGS

The subject disclosure may be better understood, and its numerous objects, features and advantages made apparent to those skilled in the art, with reference to the accompanying Drawings, wherein.

DETAILED DESCRIPTION OF THE INVENTION

Figure 1A:
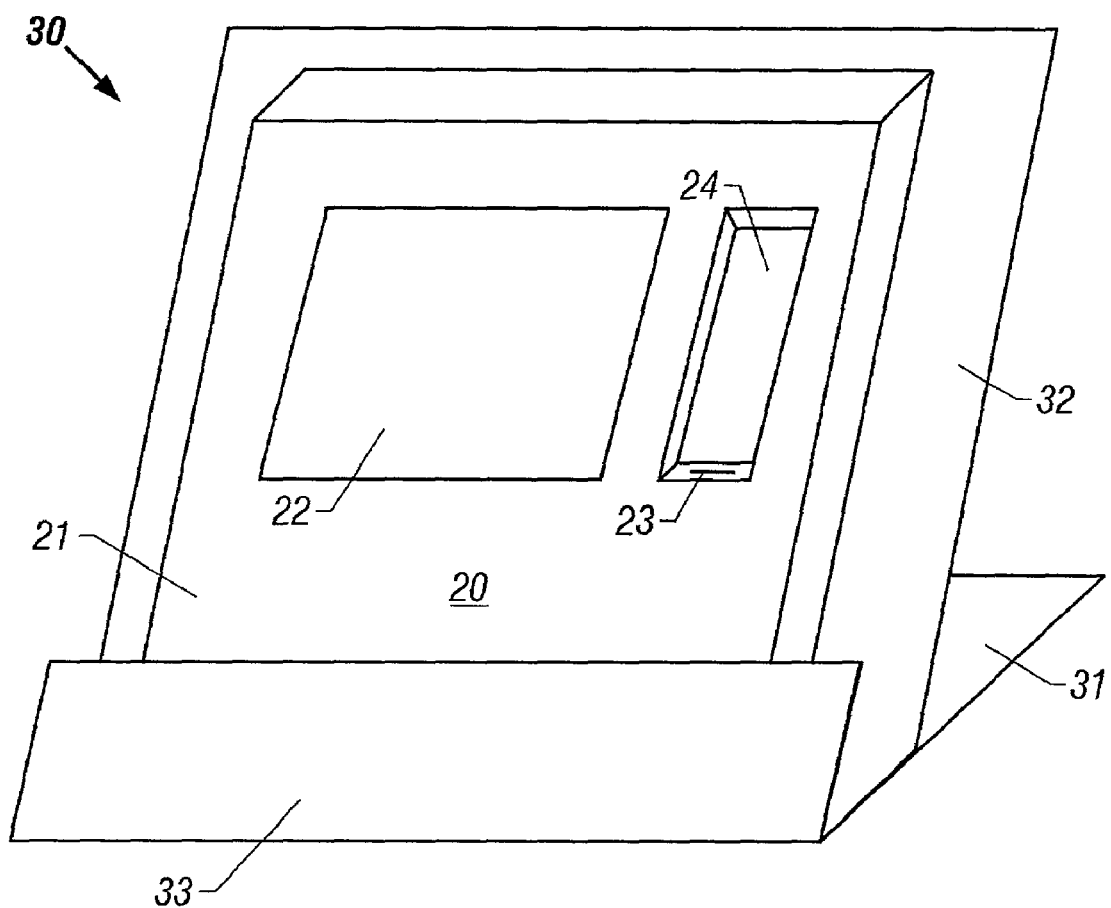
FIG. 1A is a front perspective of a docking station including a housing on which is mounted an enhanced video display and which includes a recessed cradle for a portable cellular telephone or other form of WCD.
Figure 1C:
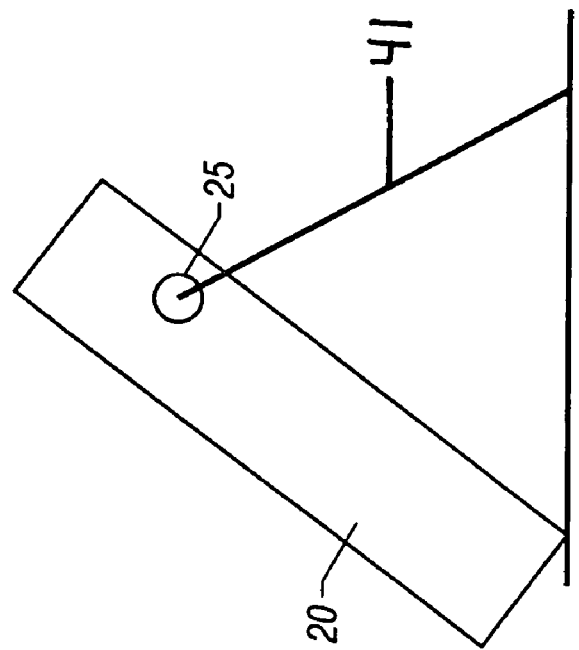
FIG. 1C is a side view of the docking station that illustrates an alternative support mechanism for the docking station, in the form of a leg assembly that is pivotally attached to the housing.
Figure 1B:
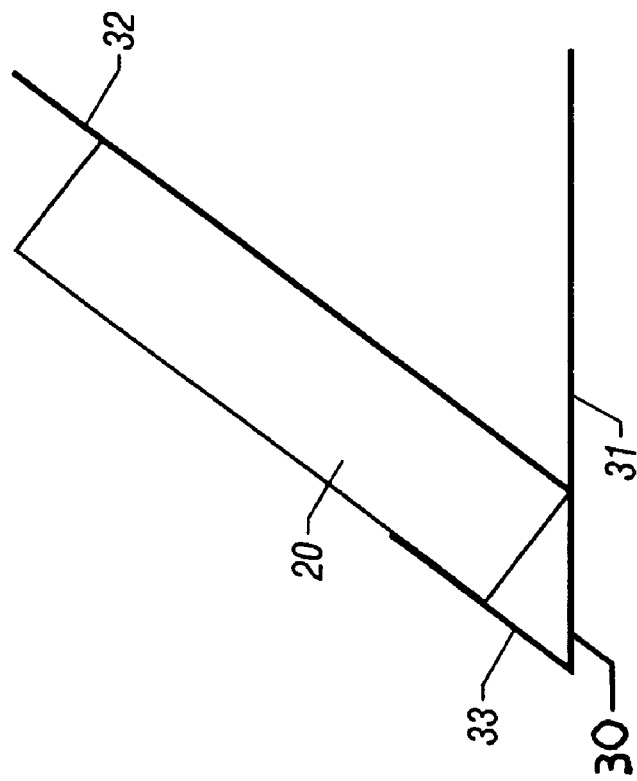
FIG. 1B is a side view of the docking station and depicts a stand for supporting the docking station in an orientation that facilitates viewing of the video display by a user.

For a thorough understanding of the subject invention, reference is made to the following Detailed Description, including the appended claims, in connection with the above-described Drawings. Referring now to FIGS. 1A, 1B and 1C, the docking station depicted therein is seen to constitute a support structure for a wireless communications device (WCD) (not shown). The WCD may be a cellular telephone, a POS telephone, a pager, or the like. The support structure, in a preferred embodiment, assumes the form of housing 20 that is characterized by a rectangular cross-section. The housing may have approximate dimensions 10" (H).times.15" (W).times.1" (D). Housing 20 has a substantially planar front surface 21 on which is mounted a flat-panel display device 22. Numerous manufacturers supply display devices of wide-ranging characteristics that are suitable for use in the subject invention. What is primarily significant here is that display device 22 provide performance characteristics, including size and resolution, that are markedly superior to the LCD displays typically incorporated with currently available WCDs. Housing 20 also exhibits a cradle 24 for a WCD. Cradle 24 is shown in FIG. 1A as recessed with into front surface 21 of housing 20. The precise geometry of the cradle is not deemed critical, and the salient requirement of the cradle contour is to facilitate convenient placement and reliable retention of the WCD. In general, it may be assumed that the cradle is configured to be complementary to the form of the WCD. Also exhibited in cradle 24 is an electrical connector 23. The primary purpose of connector 23 is to effect an electrical interface between the docking station and the WCD. In this regard, connector 23 contains a number of electrical contacts necessary to realize the necessary conductive connections, as specified below, between the docking station and the WCD. Therefore connector 23 will afford the number of contacts 230, et seq. that have the physical dimensions necessary for compatibility with a mating connector provided by the WCD.

For convenient docking and operation of the WCD in the docking station, a mechanism is provided that maintains housing 20 in a generally upright position, in a manner that facilitates accessible viewing by a user of information contained on display device 22. Many options are available to perform this function. Specifically, FIG. 1B, in a view at a side of housing 20, illustrates a stand 30 on which the housing may be disposed. The stand exhibits a bottom portion 31 on which the housing sits and an oblique (to the bottom portion 31) back portion 32 on which housing 20 reclines. In addition, stand 30 includes an integral lip 33 that maintains housing 20 upright in the stand. Stand 30 may be fabricated from any suitable material, including but not limited to metal, plastic, and such.

Alternatively, housing 20 may be maintained in a more or less upright position through a leg assembly 41 that is rotatably attached in the sides of housing 20. FIG. 1C depicts the alternative leg assembly. As depicted in FIG. 1C, leg assembly 41 may be inserted into opposite sides of housing 20 at receptacles 25, one of which is viewable in FIG. 1C.

Figure 2:
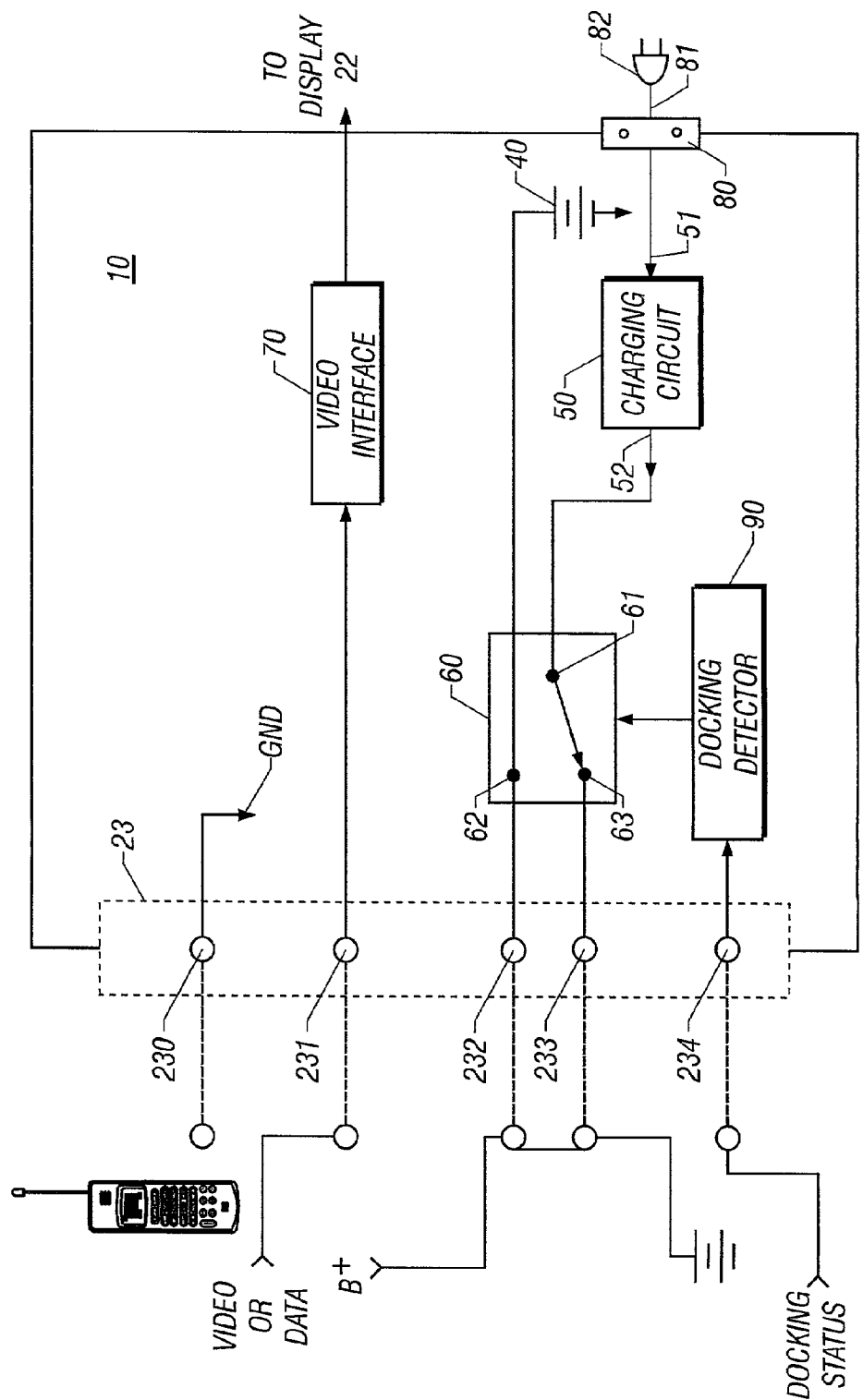
FIG. 2 is a functional block diagram of interface components that effectuate interoperability of the WCD with the docking station.

Housing 20 encloses an electronic interface module 10 that includes a number of components that cooperate to impart enhanced operational features to a WCD when the WCD is docked at the docking station. These components are depicted in FIG. 2. As indicated above, and reiterated in FIG. 2, the docking station electrical interface between the docking station and the WCD is effected through connector 23, which in FIG. 2 is shown to comprise at least four contacts 230, 231, 232 and 233, which correlate to four contacts at a WCD interface connector. Contact 230 is connected to circuit ground (GND) at the docking station and is intended to effect continuity between the docking station and the WCD ground. Contact 231 is denominated "Video" and accepts the video output from the WCD. The video (or data) output of the WCD applied to contact 231 is coupled to a video interface circuit 70. The video interface circuit converts the video signal output from the WCD to the signal(s) necessary to drive display device 22.

In one embodiment, video interface circuit 70 conforms to the Digital Visual Interface (DVI) Specification promulgated by the Digital Display Working Group (DDNG) and published in April 1999. A copy of the DVI specification is included as Appendix A, and is incorporated in its entirety into this Description.

The docking station includes an internal rechargeable battery 40 that is coupled to a contact 232 on connector 60. In the absence of the WCD, battery 40 is coupled to charging circuit 50 through switch 60. Charging circuit 50 is coupled to docking station connector 80 and from connector 80 through line cord 81 and plug 82 to an AC outlet. Switch 60 has pole terminal 61 coupled to the output 52 of charging circuit 50. The normally closed (NC) terminal 62 of switch 60 is coupled to contact 232. In a manner such as described below, switch 60 is normally closed when no WCD is docked at the station. In this orientation, switch 60 couples charging circuit 50 to internal battery 40 in order to recharge, or maintain the charge on, battery 40. However, when a WCD is docked, docking detector 90 causes switch 50 to be oriented in the normally open (NO) position, in which pole 61 is connected to NO terminal 63. Terminal 63 is in turn connected to contact 233 on connector 23. Contact 233 is coupled through a corresponding contact on the WCD connector to a rechargeable battery in the WCD. In this manner, when a WCD is docked at the docking station, charging circuit 50 operates to recharge the WCD internal battery. In this mode, docking station battery 40 is coupled through contact 232 to a mating contact on the WCD connector. That contact is electrically connected to a B+ bus in the WCD, so that power is provided to the WCD by the docking station.

As an additional advantageous feature, the arrangement described above allows the WCD rechargeable battery to be recharged, even when the docking station is operating in a portable mode. That is, when line cord 81 is detached from connector 80, or when plug 82 is simply removed from the AC outlet, the docking station becomes portable, and the user will be able to move from one location to another or to perambulate about a given location, while continuing to receive the benefit of the enhanced display. Nevertheless, even in this portable mode, charging circuit 50 will continue to charge the WCD battery.

In order to effectuate the operation described above, the docking station relies on docking detector 90 to determine whether a WCD is docked. Docking detector 90 drives switch 60 in response to information indicating whether or not a WCD is docked. In an illustrative embodiment, a docking detector 90 is coupled to a contact on interface connector 23 that provides information that defines the status of the station that is whether or not a WCD is docked.

If there is no WCD docked at the station, the output of docking detector 90 will drive switch 60 to the NC orientation. That is, pole 61 will be in contact with NC terminal 62, thereby coupling charging circuit 50 to station power source 40. Conversely, if a WCD is docked, docking detector 90 will drive switch 60 to the NO orientation, in which charging circuit 50 is coupled to the WCD battery, and docking station battery 40 is coupled to in WCD $B^+$ bus.

A number of approaches may be used to provide docking status information to docking detector 90, and the disclosure is not limited by specific approach adopted in a particular embodiment. For example, a docking status contact 234 may be provided on interface connector 23. The docking status information, in this context, may simply assume the form of a logic level, a signal, an impedance to GND, or the like that is detected by docking detector 90. Alternatively, the docking station may incorporate a mechanical switch that is actuated when a WCD is docked at the docking station. In accordance with this approach, the mechanical switch may be switch 60, and the need for separate docking detector is largely obviated inasmuch as the docking detection and switching functions are both performed by switch 60.

Accordingly, although there have been shown and described above illustrative embodiments of a Docking Station for a Wireless Communication Device, including what at present is considered the best mode for carrying out the disclosure, those having ordinary skill in the art will appreciate that various changes and modifications may be made without departure from the scope of the disclosure. Therefore, the disclosure is not intended to be limited by the Description above, but is to be defined by the appended claims, and equivalents thereof.

What is claimed is:

1. A docking station for a wireless communication device, the docking station comprising:
   a support structure;
   a cradle situated in the support structure to receive the wireless communication device;
   a display situated in the support structure to display information received by the docking station from the wireless communications device;
   an energy source internal to the docking station which supplies energy to the docking station and to a rechargeable energy source in the wireless communication device when the wireless communication device is received in the cradle, the internal energy source having more charge capacity than the rechargeable energy source, sufficient to supply energy to the wireless device when the docking station is mobile;
   an electrical interface between the docking station and the wireless communications device including multiple contacts, one of the contacts coupled to accept a video signal from the wireless communications device; and
   a video interface circuit coupled to convert the video signal to drive the display.

2. A docking station for a wireless communication device, the docking station comprising:
   a docking housing;
   a display device, situated in the docking housing, that displays information received from the wireless communication device;
   a cradle, disposed on the docking housing, that receives the wireless communication device;
   a connector, situated in the cradle, that electrically couples the docking station to the wireless communication device;
   an energy source internal to the docking station which supplies energy to the docking station and to a rechargeable energy source in the wireless communications device when the wireless communications device is received in the cradle, the internal energy source having more charge capacity than the rechargeable energy source, sufficient to supply energy to the wireless device when the docking station is mobile;
   an electrical interface between the docking station and the wireless communications device including multiple contacts, one of the contacts coupled to accept a video signal from the wireless communications device; and
   a video interface circuit coupled to convert the video signal to drive the display device.

3. A docking station for a wireless communication device as defined in claim 2, wherein the connector comprises a first terminal coupled to the internal energy source.

4. A docking station for a wireless communication device as defined in claim 3, wherein the connector comprises a second terminal selectively coupled to a charging circuit in the docking housing via a switch.

5. A docking station for a wireless communication device as defined in claim 4, wherein the connector comprises a third terminal coupled to GND.

6. A docking station for a wireless communication device as defined in claim 4, wherein the switch has a pole coupled to the charging circuit and has a first terminal selectively coupled to the first terminal of the connector.

7. A docking station for a wireless communications device as defined in claim 6, wherein the switch has a second terminal selectively coupled to the second terminal of the connector.

8. A docking station for a wireless communications device comprising:
   a display device that displays information received from the communications device;
   a cradle in the docking station that receives the communications device; and
   an apparatus that selectively supplies power to the communications device, the apparatus including:
      a connector for electrically coupling the docking station to the communications device, the connector having at least first and second terminals;
      a switch having a pole, a first terminal, and a second terminal, the switch operable in response to status information indicating whether the communications device is docked at the docking station;

a charging circuit coupled to the pole of the switch;

a detector that determines whether the communications device is docked at the station and provides status information as a result of the determination;

an energy source internal to the docking station which supplies energy to the docking station and to a rechargeable energy source in the wireless communications device when the wireless communications device is received in the cradle, the internal energy source having more charge capacity than the rechargeable energy source, sufficient to supply energy to the wireless device when the docking station is mobile;

an electrical interface between the docking station and the wireless communications device including multiple contacts, one of the contacts coupled to accept a video signal from the wireless communications device; and a video interface circuit coupled to convert the video signal to drive the display device.

9. A docking station as defined in claim 8, wherein the first terminal of the switch is electrically coupled to the first terminal of the connector and the second terminal of the switch is electrically connected to the second terminal of the connector.

10. A docking station as defined in claim 9, wherein the switch operates to connect the pole terminal to the first terminal in response to status information indicating that the communications device is not docked at the docking station, whereby the charging circuit then charges the internal energy source.

11. A method of enhancing the capabilities of a wireless communications device for information handling, the method comprising:

mounting the wireless communications device on a docking station that comprises:

(a) a cradle for the wireless communications device;

(b) a display device that displays information received from the wireless communications device;

(c) a connector for effecting an electrical interface to the wireless communication device;

(d) an energy source internal to the docking station which supplies energy to the docking station and to a rechargeable energy source in the wireless communications device when the wireless communications device is received in the cradle, the internal energy source having more charge capacity than the rechargeable energy source, sufficient to supply energy to the wireless device when the docking station is mobile;

(e) a charging circuit; and (f) a switch operable in response to information indicating whether or not a wireless communications device is docked at the docking station;

providing the electrical interface between the docking station and the wireless communications device including multiple contacts, one of the contacts coupled to accept a video signal from the wireless communications device; and coupling a video interface circuit to convert the video signal to drive the display device.

12. A method as defined in claim 11, wherein, in response to information indicating that a wireless communications device is docked at the docking station, the switch couples the charging circuit to the rechargeable energy source included with the wireless communications device, and in response to information indicating that a wireless communications device is not docked at the station, the switch couples the charging circuit to the energy source internal to the docking station.

13. An assembly for docking a wireless communication device (WCD) so as to enhance the capabilities of the device, the assembly comprising:

a docking station housing having a receptacle for the WCD;

a display device that displays information received from the WCD;

an energy source internal to the docking station which supplies energy to the docking station and to a rechargeable energy source in the wireless communications device when the wireless communications device is received in the cradle, the internal energy source having more charge capacity than the rechargeable energy source sufficient to supply energy to the wireless device when the docking station is mobile;

a charging circuit;

a switching circuit, responsive to a predetermined status of the assembly, that selectively couples the charging circuit to the internal energy power source;

an electrical interface between the docking station and the WCD including multiple contacts, one of the contacts coupled to accept a video signal from the WCD;

a video interface circuit for coupling the video output of the WCD to the display device;

a connector for electrically coupling the docking station to the WCD; and a support for the housing.

14. An assembly as defined in claim 13, wherein the display device is mounted on a planar surface of the housing.

15. An assembly as defined in claim 14, wherein the support for the housing is a stand having a base portion and an oblique back portion.

16. An assembly as defined in claim 14, wherein the support is rotatably attached to the housing.

* * * * *